(12) United States Patent
Weyant et al.

(10) Patent No.: US 9,028,731 B2
(45) Date of Patent: May 12, 2015

(54) RECYCLED COMPOSITE MATERIALS AND RELATED METHODS

(75) Inventors: Kenneth Weyant, Edmonds, WA (US); Don Lilly, Bothell, WA (US)

(73) Assignee: Global Recycle Solutions, Inc., Mill Creek, WA (US)

( * ) Notice: Subject to any disclaimer, the term of this patent is extended or adjusted under 35 U.S.C. 154(b) by 310 days.

(21) Appl. No.: 13/048,865

(22) Filed: Mar. 15, 2011

(65) Prior Publication Data

US 2011/0301287 A1 Dec. 8, 2011

Related U.S. Application Data

(60) Provisional application No. 61/340,286, filed on Mar. 15, 2010.

(51) Int. Cl.
| | |
|---|---|
| *B29B 17/00* | (2006.01) |
| *B29C 70/12* | (2006.01) |
| *B29B 17/04* | (2006.01) |
| *B29K 105/06* | (2006.01) |
| *B29K 709/08* | (2006.01) |
| *B29L 31/08* | (2006.01) |

(52) U.S. Cl.
CPC .............. *B29C 70/12* (2013.01); *B29B 17/0042* (2013.01); *B29B 2017/0484* (2013.01); *B29K 2105/06* (2013.01); *B29K 2709/08* (2013.01); *B29L 2031/085* (2013.01); *B29B 17/0404* (2013.01); *B29B 17/0412* (2013.01)

(58) Field of Classification Search
CPC B29B 17/00; B29B 17/0005; B29B 17/0042; B29B 17/0412; B29B 17/0404; B29B 2009/00; B29B 2017/042; B29B 2017/0484; B29C 70/0406; B29C 70/70; B29C 70/72; B29C 70/04; B29C 70/06; B29C 7/12; B29K 2709/00; B29K 2709/08; C08K 9/00; C08K 9/08; C08K 9/10; B29L 2031/085
USPC ........... 521/40, 40.5, 41, 43, 46, 47, 47.5, 48, 521/49, 49.5, 49.8; 264/37.1, 109, 140; 524/1; 523/204
See application file for complete search history.

(56) References Cited

U.S. PATENT DOCUMENTS

| | | | | |
|---|---|---|---|---|
| 5,569,424 | A | * | 10/1996 | Amour ........................ 264/115 |
| 2001/0051249 | A1 | * | 12/2001 | Gagas et al. .................... 428/99 |
| 2008/0217811 | A1 | * | 9/2008 | Wolf ............................ 264/238 |

OTHER PUBLICATIONS www.appropedia.com: "Recycling of Wind Turbine Blades", Pearce et al., Dec. 22, 2009, entire article.*

* cited by examiner

*Primary Examiner* — Frances Tischler
(74) *Attorney, Agent, or Firm* — Patentique PLLC

(57) ABSTRACT

Methods of producing particles of fiber and resin from fiber-resin composite materials are disclosed. The particles may be combined with a resin system and optionally combined with fillers, binders or reinforcements to produce new cured solid composite products.

18 Claims, 3 Drawing Sheets

RECYCLED COMPOSITE MATERIALS AND RELATED METHODS

CROSS-REFERENCE TO RELATED APPLICATIONS

This application claims the benefit of priority from U.S. Provisional Patent Application No. 61/340,286, filed Mar. 15, 2010, which is hereby incorporated by reference in its entirety as if fully set forth.

FIELD OF THE DISCLOSURE

This disclosure relates to the recycling and reuse of composite materials, such as fiberglass and other fiber-reinforced materials, to create new products.

BACKGROUND OF THE DISCLOSURE

Nearly every industry utilizes fiberglass and fiber-reinforced materials for a variety of components and products. Worldwide demand for these materials has exploded due to increased demand for both consumer and industrial products, most notably in electronics, aircraft, construction, renewable energy, automotive, and infrastructure development (e.g. public structures). In United States, China, and India, nearly 80% of consumer purchases are discarded after a single use. These economies offer a tremendous opportunity to capitalize on the surplus of useable waste materials. The global demand for clean energy and infrastructure up-gradation is also expected to boost the composite fiber glass industry's growth in the future.

The government of the United States has become increasingly interested in developing sustainable energy infrastructure. Onshore wind resources could generate nearly 37,000,000 gigawatt-hours annually, more than nine times current total electricity consumption in the United States. In 2009, the wind industry added nearly 10,000 megawatts of new capacity, enough to power the equivalent of 2.4 million homes or generate as much electricity as three large nuclear power plants. Therefore, fiberglass demand from wind turbine manufacturers is expected to grow considerably over the next decade. A single turbine blade may require 28,600 pounds of fiberglass.

Fiberglass and fiber-reinforced materials are also in demand in construction of buildings, roads and other infrastructure. In the United States, insulation demand is expected to rise 5.3% annually through 2012, based on renewed growth in housing construction. Fiberglass will remain the leading insulation material and outpace demand for the second largest type, foamed plastic. Fiberglass building materials are the newest and most promising advancement in the construction material industry. In the past, steel doors and plastic vinyl windows dominated the building market. But market trends are quickly transforming the marketplace. Fiberglass is more aesthetically pleasing than steel and vinyl, and can be designed to appear identical to wood but last for decades of use. Whereas vinyl windows cannot be painted, fiberglass frames can be painted in any color. From 2000 to 2005, the fiberglass door market increased from 9% to 23% of the market and was expected to reach 33% by the end of 2009. Indeed, fiberglass doors and windows have become the preferred material for such building products. Other growth areas in the pipes, power poles, automobile and marine construction.

Concrete can be strengthened by 70% using recycled fiberglass reinforced plastic (FRP). Moreover, FRP material has been proven to also improve asphalt, rubber, and wood products. Material can be applied to improve, guard rail posts, drop blocks for bridge walls, expansion joints, sign posts, noise barriers, traffic barriers, light posts, curbing, erosion control, and quick fix coating and fillers. FRP materials can be used in the repair of roads in poor condition and in the repair of bridges in the United States.

In many ways, however, fiberglass and fiber-reinforced materials have become problematic both in consumer and commercial markets due to negative environmental effects. Fiberglass insulation, among other products, for example, is now viewed as a potential hazard to the environment and one's health if inhaled. In fact, the state of California mandates that "fiberglass producers to use at least thirty percent post-consumer cullet in fiberglass building insulation made or sold in California" (California Integrated Waste Management Board, 2009). At the same time, there is a growing demand for recycling and recycled consumer products in the U.S. According to the Environmental Protection Agency, Americans are recycling now more than ever in U.S. history. In 1990, Americans recycled 16% of waste, a percentage that increased to 32% in 2005. Municipal solid waste also decreased by two million tons to just under 246 million tons nationwide.

Fiberglass and other fiber-reinforced materials have long been difficult to recycle into new and useful products. Some manufacturers of fiberglass goods, for example, are trying to dramatically increase use of reclaimed fiberglass in the production processes. While these companies have investigated methods to reclaim fiberglass for consumer products both domestically and abroad, manufacturers have only been able to obtain sufficient reclaimed fiberglass to replace ten to twenty-five percent of virgin resins used in fiberglass products. In many cases, large-scale items such as composite windmill turbine blades are simply buried in landfills or burned.

There are many reasons for the interest in maximizing the use of reclaimed fiber-reinforced products. While reclaimed fiberglass offers a way to reduce manufacturing costs, environmental concerns are also motivating manufacturers to reuse or recycle fiber-reinforced products. Consumers are showing a preference for environmentally aware manufacturers, and the federal and state governments are investigating the mandating of a timetable to eliminate fiberglass from the waste stream or mandating the use of recycled composite materials in finished goods.

Past attempts at recycling fiberglass have failed because the process of breaking down the discarded materials was too complex and costly, and because the collection system to ensure an ample supply of incoming materials was not in place. Past equipment lacked the necessary advancement to produce viable reclaimed fiber-reinforced products. Many of the ventures failed because they could not get enough raw materials to meet the demands. Furthermore, the concerns of contingent liability prevented some generators from sending materials to be recycled.

The citation of documents herein is not to be construed as reflecting an admission that any is relevant prior art. Moreover, their citation is not an indication of a search for relevant disclosures. All statements regarding the date(s) or contents of the documents is based on available information and is not an admission as to their accuracy or correctness.

BRIEF SUMMARY OF THE DISCLOSURE

The disclosure relates to products that contain composite material as well as methods of processing the material and methods of making the products. In many cases, the composite material is fiberglass or other fiber-reinforced material, including recycled fiberglass or recycled fiber-containing material. The composite material is broken down into particles that are used in forming new products. The new products may be designed to emit no volatile organic compounds (VOCs) and no hazardous air pollutants, even in cases where the composite material emits VOCs or hazardous air pollutants prior to use as disclosed herein. The products may be designed for use in structural applications, with non-limiting examples being roads, railroad ties, traffic barriers, telephone poles and telephone pole cross bars, dock planking, sea walls, pilings, bumper stops, and posts. In other applications, the products may be for use in non-structural or decorative consumer products.

In a first aspect, the disclosure includes a method of processing composite material into smaller pieces, optionally with resin released from the material. In some cases, the composite material is fiberglass or another fiber-reinforced material, and the method produces pieces of fiber and resin and/or pieces that are a mixture of fiber and resin. In some embodiments, the small particles are used in forming new composite products as disclosed herein.

In a second aspect, the disclosure includes a method of producing products with the processed composite material produced by a method disclosed herein. In some cases, the processed material is recycled or reclaimed fiberglass or fiber-reinforced materials as disclosed herein.

In some embodiments, the methods of the disclosure may be viewed as the recycling of composite materials or raw materials that are waste or damaged beyond usefulness. In many embodiments, the composite materials are large finished products, such as boat hulls, aircraft parts and composite windmill blades as non-limiting examples. In such cases, the composite materials may be further processed, before or after use in a method disclosed herein, to remove undesirable contaminants or components.

In other embodiments, the methods of the disclosure are practiced in relation to producing composite products with recycled components. Recycled components of the disclosure include composite material, such as fiberglass or other fiber-reinforced material, that has been processed by a method disclosed herein. In many cases, the produced products emit no or low amounts of VOCs or hazardous air pollutants.

In further embodiments, the methods of the disclosure are practiced in relation to a recycling program that sets baseline waste generation amounts and provides goals and targets for reducing waste generation. The program tracks waste reduction and may report results on an annual or other basis. Waste reductions may be converted to carbon equivalents for which certification may be provided.

In an additional aspect, the disclosure includes products that contain composite material processed by a disclosed method. In many cases, the processed composite material is recycled or reclaimed fiberglass or other fiber-reinforced materials. The products may be structural or non-structural and may also have decorative aspects.

In other non-limiting embodiments, the products include additional components such as rubber, plastics, aggregate solid particulates, aggregate rock, silica, fly ash, cement, sand, and other kinds of crushed rock or gravel.

In further embodiments, the products are produced by curing of processed composite material together with a resin system.

DETAILED DESCRIPTION OF MODES OF PRACTICING THE DISCLOSURE

Figure 1:
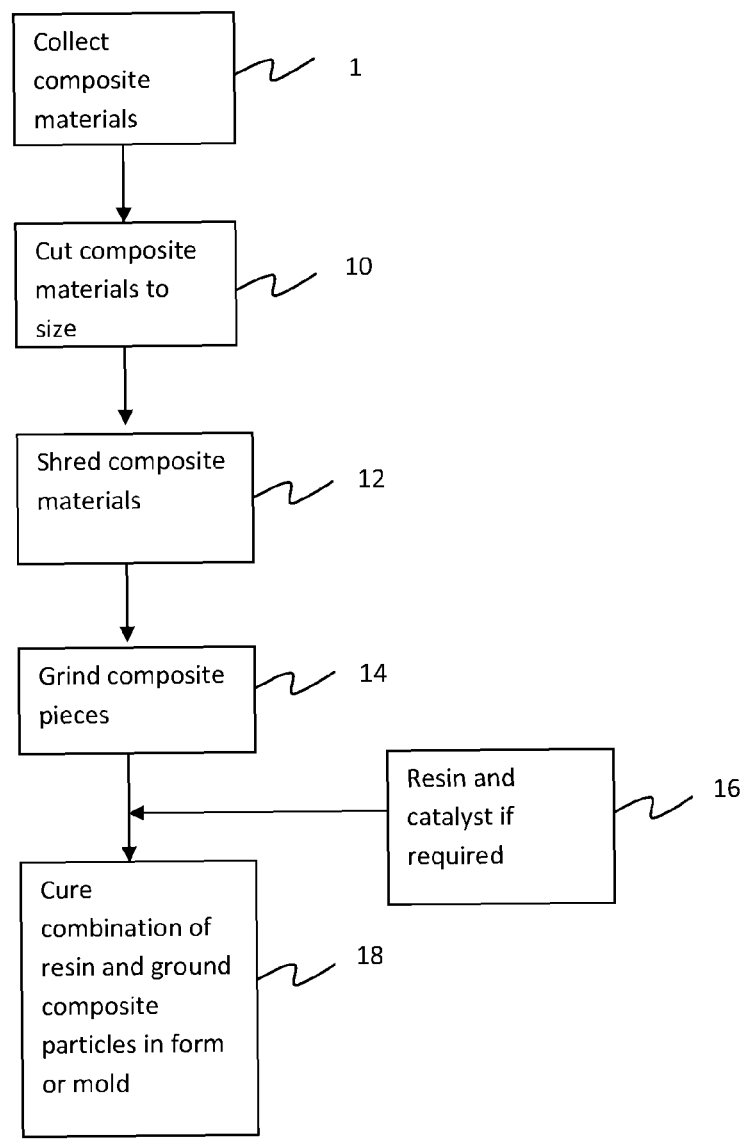
FIG. 1 is a chart illustrating a method of processing composite materials.

As described herein, the disclosure includes a method of processing, or breaking down, a composite material for subsequent use, such as the production of a product as disclosed herein. In some cases, the method produces particles from a composite material or a reclaimed (or recycled) composite material. A disclosed method to break down composite material may include, as non-limiting examples, shredding, crushing, chopping, cutting, ripping, tearing, pounding, grinding or otherwise degrading a composite material to form small pieces of composite material. The small pieces of composite material may then be ground to form smaller particles of composite material.

In some embodiments, a method of the disclosure is practiced with a commercial or industrial shredder and a commercial or industrial fiber-resin product grinder such as a Seawolf FRP Grinder. In some cases, a shredder and/or grinder of the disclosure is portable such that the processing of composite material can occur on site or at the location of the material, thereby reducing transportation costs.

In many embodiments, the composite material used in a disclosed method recycles pre-existing composite products or raw materials that are waste, surplus or damaged beyond usefulness. Non-limiting examples of sources of such materials include cured or uncured scrap and rovings from fiberglass and fiber-reinforced plastic manufacturers and product manufacturers, boat hulls and other marine equipment, composite turbine blades, including windmill blades, and aircraft parts. In many cases, the input materials are fiber-reinforced materials formed from polyester and styrene resin. Non-limiting examples of fiber materials include fiberglass, graphite, carbon, nylon, and KEVLAR® and other synthetic fibers.

In some cases, the composite material is too large to fit into the shredder or grinder. Therefore, the methods of the disclosure may include crushing, cutting, chopping, ripping, tearing or otherwise reducing large pieces of composite material to a size and shape that fits into a commercial or industrial shredder, crusher, chopper or grinder. Cutting or crushing process or procedure are known in the art to reduce the size of the composite materials, including those processes and procedures that require air permits from the Environmental Protection Agency (EPA) for indoor or outdoor operation.

In some embodiments, composite materials are sorted for size and content prior to processing as disclosed herein. The composite materials may also be cleaned before processing with appropriate solvents or cleaners before, or during the break down process. In some cases, the cleaning occurs before shredding. In many embodiments, the composite materials include additional components that are undesirable for inclusion in new composite products, or foreign material has been combined with the composite materials. Non-limiting examples of such contaminants include wood products, and ferrous and non-ferrous metals. In such cases, additional processing of the composite materials may be performed to remove the contaminant(s). Non-limiting examples of additional processing include exposure of composite materials to a magnet or magnetic surface to attract and remove select metal contaminants. Such magnets may be part of a conveyance system such as a vibratory conveyor. By way of another example, pieces or particles of composite material may be placed in a rotational device such as a centrifuge or cyclone and spun at high revolutions so that heavier objects such as pieces of metal or stone are separated from the lighter pieces or particles of composite material. Of course, multiple separation processes may be performed in relation each of the acts in a method of the disclosure. In many cases, any metal collected from these and other separation processes known in the art may also be recycled.

The disclosure also includes methods including the grinding of small pieces of composite material into smaller particles of composite materials. Optionally, the particles, which may comprise both fiber and resin, need not be separated into fiber and resin components as disclosed in U.S. Pat. No. 5,569,424, which is hereby incorporated by reference as if fully set forth. The particles may be further used to form a solid composite product as disclosed herein. As a non-limiting example, the particles may be combined with a resin system to produce a solid, fiber-reinforced composite product. In other cases, the particles may be combined with other dry binders, fillers, reinforcements, or strengthening agents to produce a dry mixture product. In further instances, the particles may be used as an additive or as a strengthening matrix to increase product life, strength, and/or durability of an enhanced product. Non-limiting examples of an enhanced product include plastic resins, resin castings, casings, fiberboard, traffic barriers, railroad ties, planking, concrete, rubber and wood composite products.

In many embodiments, the small pieces to be ground down are no greater than about three inches in diameter. In other embodiments, the pieces of the invention are not greater than about 2.5 inches, not greater than about two inches, or not greater than about 1.5 inch in diameter. In some embodiments, the pieces are less than about one inch to about three inches in diameter. As used throughout this disclosure, the term "about" followed by a numerical value indicates a range that includes the numerical value and values that are from ten (10) percent greater than to ten (10) percent less than the numerical value.

In other embodiments, the small pieces may be in the shape or form of rods, strips, cubes, rectangular prisms, cylinders, or irregular shapes, wherein the width or length of the shape is less than about 24 inches. In other embodiments, the pieces have a width or length less than about 18 inches, less than about 12 inches, less than about 10 inches, less than about 8 inches, less than about 6 inches, less than about 4 inches or less than about 2 inches.

In many embodiments, the disclosed grinding process produces particles with an average fiber length of about one inch or less. In other embodiments, the particles have an average fiber length of about one-half inch or less, about one-quarter inch or less, or about one-eighth inch or less. In some embodiments, the particles of the invention have an average fiber length from about one-half inch to about one-eighth inch, or about one-half to about one-quarter inch, or about one-quarter to about one-eighth inch.

As described herein, a method of the disclosure comprises making or forming solid composite products with particles of composite material. The composite material may be "recycled" material produced by the break down process disclosed herein. The disclosure thus includes a method of processing a composite material as described herein to form particles of composite material that are then used to produce a solid composite product. In some embodiments, the method includes shredding, crushing and/or grinding a composite material, such as a reclaimed material, into particles, combining the particles with resin to form a mixture, disposing the mixture into a form or a mold, and curing the mixture to form a solid composite product.

Of course particles produced in accordance with the disclosure may be stored separately or in mixture with one or more agent. Non-limiting examples of agents include dry binders, fillers, catalysts, reinforcements, and strengthening agents suitable for use in forming a composite product. As a non-limiting example, the ground composite material (particles) may be combined with aggregate rock and/or silica and stored until use in production or manufacture of a composite product.

In some embodiments, the resin may require a catalyst for operation. In other cases, the resin does not require a catalyst. In some cases, the resin may require applied heat and/or pressure to cure, while in other cases the resin may be cured at room temperature. In yet other cases, the resins may also have been recycled from pre-existing materials. Non-limiting examples of resins include flowable plastic, polymer, epoxy, saturated and unsaturated non-styrenated polyester, and vinyl ester resins. In some cases, use of a styrene-free polyester resin will reduce or eliminate the outgassing of VOCs or hazardous air pollutants from the cured solid composite product.

As disclosed, a method of the disclosure may include curing the mixture of resin and particles, with or without the addition of other components and optionally without applied heat or pressure. In many cases, the mixture is disposed, placed or poured into a form or mold. In other cases, the mixture is extruded into a form or closed molding. In further cases, the mixture is poured into casts. In yet other cases, the mixture may be formed into a large block or other shape from which multiple products may be machined or otherwise formed. In other embodiments, appropriate pressures and temperatures are applied to produce the cured products.

In some embodiments, a method of producing a composite product is practiced with one or more additional components in forming a solid composite product. Non-limiting examples of components in a particle-resin mixture include binders, fillers, resins, catalysts, reinforcements, and strengthening agents. Additional non-limiting examples of components include aggregate solid particulates, aggregate rock, gravel, sand, wood, textiles, pipes, rods, bars, fibers, metals, honeycombs, spacers, fillers, resin, recycled resin, plastic resin, catalysts, recycled polymers, paper fibers, binders, cement, magnesium oxide, water, cement, limestone, granite, chemical additives, and combinations thereof. In some cases, an additional component is mixed into the resin-particle mixture. In other cases, a component is disposed or placed into the form, mold, cast or the like prior to the addition of the mixture. In yet other cases, the component is disposed or placed into the form, mold, cast or the like after the addition of the mixture.

The disclosure further includes a method of combining composite particles with binders, fillers or other reinforcement materials, optionally mixing the combination with resin, optionally disposing the mixture in a mold and optionally curing the mixture.

As disclosed herein, a cured composite product comprises resin and particles of composite, optionally fiber-reinforced, material. In many cases, the products may also include additional components such as aggregate rock, gravel, sand, wood, textiles, pipes, rods, bars, fibers, metals, honeycombs, spacers, fillers, resin, recycled resin, plastic resin, catalysts, recycled polymers, paper fibers, binders, cement, magnesium oxide, water, cement, limestone, granite, chemical additives, and combinations thereof.

As described, a composite product of the disclosure comprises resin and particles of composite material. In some cases, the particles of composite material form no more than about 50% by weight of the cured product. In other cases, the particles form no more than about 40%, about 30%, about 25%, about 20%, about 15%, about 10% or about 5% by weight of the cured product. Alternatively, in some cases the resin comprises less than about 50%, about 40%, about 30%, about 25%, about 20%, about 15% or about 10% of the weight of the cured product.

In other embodiments, a composite product of the disclosure comprises resin, particles of composite material and aggregate particulates or aggregate rock. In some cases, the particles of composite material form no more than about 50% by weight of the cured product. In other cases, the particles form no more than about 40%, about 30%, about 25%, about 20%, about 15%, about 10% or about 5% by weight of the cured product. In some cases the resin comprises less than about 50%, about 40%, about 30%, about 25%, about 20%, about 15% or about 10% of the weight of the cured product. In other cases, the aggregate comprises less than about 80%, about 70%, about 60%, about 50%, about 40%, about 30% or about 20% of the weight of the cured product. In yet other embodiments, the product further includes silica, which forms no more than about 40%, about 30%, about 25%, about 20%, about 15%, about 10% or about 5% by weight of the cured product.

In some embodiments, a composite product of the disclosure comprises resin, particles of composite material, silica and aggregate rock. In some cases, the ratio of these four components by weight in the cured product is about 25:15:20:40. In other cases, the ratio is about 20:20:20:40 or about 25:10:20:45.

In other embodiments, a composite product of the disclosure may withstand a compressive stress of at least about 10,000 psi with a compressive stress of less than about 7%. In further embodiments, the weight of a product of the disclosure may increase by less than about 1% after immersion in water for 24 hours.

Having now generally provided the disclosure, the same will be more readily understood through reference to the following examples which are provided by way of illustration, and are not intended to be limiting of the disclosure, unless specified.

EXAMPLES

Example 1

Manufacture of Prototypes

Prototypes with dimensions of about 0.75"×1.0"×10" were produced with the following mixture:
23% resin by weight
15% ground recycled fiberglass product with ¼" fiber length
20% silica
42% aggregate rock in varying sizes
The mixture was packed into a high density polyethylene molds and cured under vacuum pressure. The prototypes were machined following curing.

Example 2

Prototype Testing—Flexural Bending

A flexural bending test was performed on prototypes according to Example 1 with the following results.

TABLE 1

|   | Width (in) | Thickness (in) | Displacement at Max Load (in) | Max load (lbf) | MOE (psi) | MOR (psi) | Specimen State |
|---|---|---|---|---|---|---|---|
| 1 | 1.000 | 0.750 | 0.189 | 175.7 | 213458 | 3012.4 | Vacuum Bagged - Smooth |
| 2 | 1.000 | 0.750 | 0.153 | 162.6 | 209347 | 2786.7 | Vacuum Bagged - Rough |
| 3 | 1.000 | 0.750 | 0.140 | 210.4 | 307081 | 3605.9 | Vacuum Bagged - Smooth/Rough |
| 4 | 1.000 | 0.750 | 0.135 | 158.7 | 217193 | 2719.8 | Hard Packed |
| 5 | 1.000 | 0.750 | 0.154 | 177.6 | 195861 | 3044.4 | Hard Packed |
| 6 | 1.000 | 0.750 | 0.118 | 130.5 | 215746 | 2236.8 | Hard Packed |
| Mean | 1.000 | 0.750 | 0.148 | 169.2 | 226448 | 2901.0 | |
| St. Dev | 0.000 | 0.000 | 0.024 | 26.310 | 40245.683 | 450.980 | |
| COV | 0.000 | 0.000 | 16.267 | 15.546 | 17.773 | 15.546 | |

The modulus of elasticity (MOE) and the modulus of rupture (MOR) calculations were performed for each specimen and an average was calculated. The sample had an average MOE of 226,448 psi and a MOR of 2,901 psi.

Example 3

Prototype Testing—Compression

A compression test was performed on smaller sections of prototypes according to Example 1 with the following results.

TABLE 2

|   | Width (in) | Depth (in) | Extension at Maximum Load (in) | Maximum load (lbf) | Compressive stress at Maximum load (ksi) | Compressive strain at Maximum load (%) | Modulus (automatic youngs) (psi) |
|---|---|---|---|---|---|---|---|
| 1 | 0.996 | 0.990 | −0.050 | −11573.953 | 11.74 | 6.18 | 339340 |
| 2 | 0.955 | 0.990 | −0.045 | −11138.159 | 11.78 | 5.96 | 353341 |
| 3 | 0.904 | 0.990 | −0.053 | −10782.110 | 12.05 | 6.88 | 341853 |
| 4 | 0.944 | 0.984 | −0.043 | −10934.716 | 11.77 | 5.62 | 367608 |
| 5 | 0.885 | 0.991 | −0.044 | −9776.653 | 11.15 | 5.55 | 358623 |
| 6 | 0.943 | 0.988 | −0.054 | −10683.755 | 11.47 | 7.07 | 314801 |

TABLE 2-continued

|  | Width (in) | Depth (in) | Extension at Maximum Load (in) | Maximum load (lbf) | Compressive stress at Maximum load (ksi) | Compressive strain at Maximum load (%) | Modulus (automatic youngs) (psi) |
|---|---|---|---|---|---|---|---|
| Mean | 0.938 | 0.989 | −0.048 | −10814.891 | 11.66 | 6.21 | 345928 |
| St. Dev. | 0.039 | 0.003 | 0.005 | 598.539 | 0.311 | 0.638 | 18520 |
| COV | 4.179 | 0.259 | −10.061 | −5.534 | 2.667 | 10.275 | 5 |

The prototype sections performed remarkably well, averaging a maximum stress of 11,660 psi.

Example 4

Specimen Testing—Water Absorption

Specimens were fully immersed in distilled water for a period of 24 hours with the following results.

TABLE 3

Water Absorption Testing

| Specimen | Initial Weight (g) | Final Weight (g) | Weight Change % |
|---|---|---|---|
| 1 | 5.3553 | 5.3974 | 0.7851 |
| 2 | 3.6210 | 3.6503 | 0.6230 |
| 3 | 3.3694 | 3.3935 | 0.6637 |
| 4 | 4.3855 | 4.4224 | 0.8414 |
| 5 | 3.7204 | 3.7517 | 0.8413 |
| Mean | 4.0903 | 4.1242 | 0.8311 |
| St. Dev. | 0.8006 | 0.8051 | 0.0290 |
| COV (%) | 19.574% | 19.547% | 3.466% |

The specimens experienced an average weight change of 0.8311%.

Example 5

Referring to FIG. 1, composite materials are collected in 1 from original equipment manufacturers and other recycling sources. Composite materials are cut to size in 10 with power saws or other cutting equipment to fit into an industrial or commercial shredder. The composite materials are shredded into pieces in 12, after which the pieces are placed in a commercial or industrial grinder in 14. The resulting composite particles are combined with resin system 16 and cured in 18 in a mold or form under applied pressure and temperature as necessary.

Example 6

Figure 2:
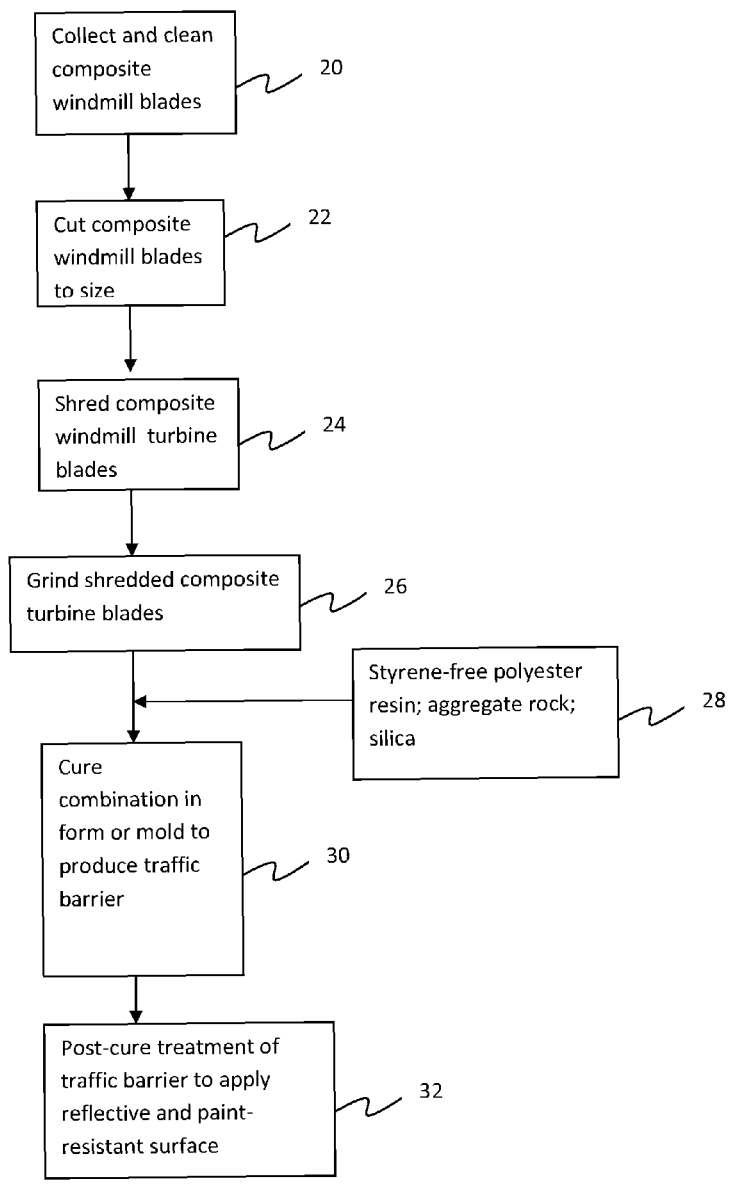
FIG. 2 is a chart illustrating a method of recycling composite materials to produce new solid composite products.

Referring to FIG. 2, a windmill composite turbine blade weighing about 22,000 pounds and about 220 feet long is collected and cleaned at 20. The blade is cut into sections each about 6.5" by 8.5" in height and width in 22 in order to fit into a commercial or industrial shredder. Each section is fed into a shredder of sufficient size that produces small pieces of composite material of about 1.5" to 2.5" in diameter and not more than 12" in length in 24. The resulting pieces are fed into a composite grinder at 26 using an appropriate screen size to produce ground small particles of composite material with an average fiber length of ¼ inch.

Additional fillers, binders or other reinforcement material, together with a resin system, are introduced at 28. The fillers are aggregate rock and silica, and the resin is styrene-free polyester resin. The combined mixture is packed into a form or mold and cured to produce a traffic barrier in 30. The traffic barrier is treated with finishes that are reflective and/or resist graffiti paints in 32.

Example 7

Ground small particles of composite material with an average fiber length of ¼ inch is combined with aggregate rock, silica and styrene-free polyester resin in a ratio of 42:20:15:23 and thoroughly mixed. The mixture is poured into a railroad tie mold in which a 4.5" diameter PVC pipe has been placed. The mixture is poured around and enrobes the pipe. The composite is cured at room temperature. The resulting railroad tie withstands a minimum of 10,000 psi with less than 7% compressive strain.

Example 8

Figure 3:
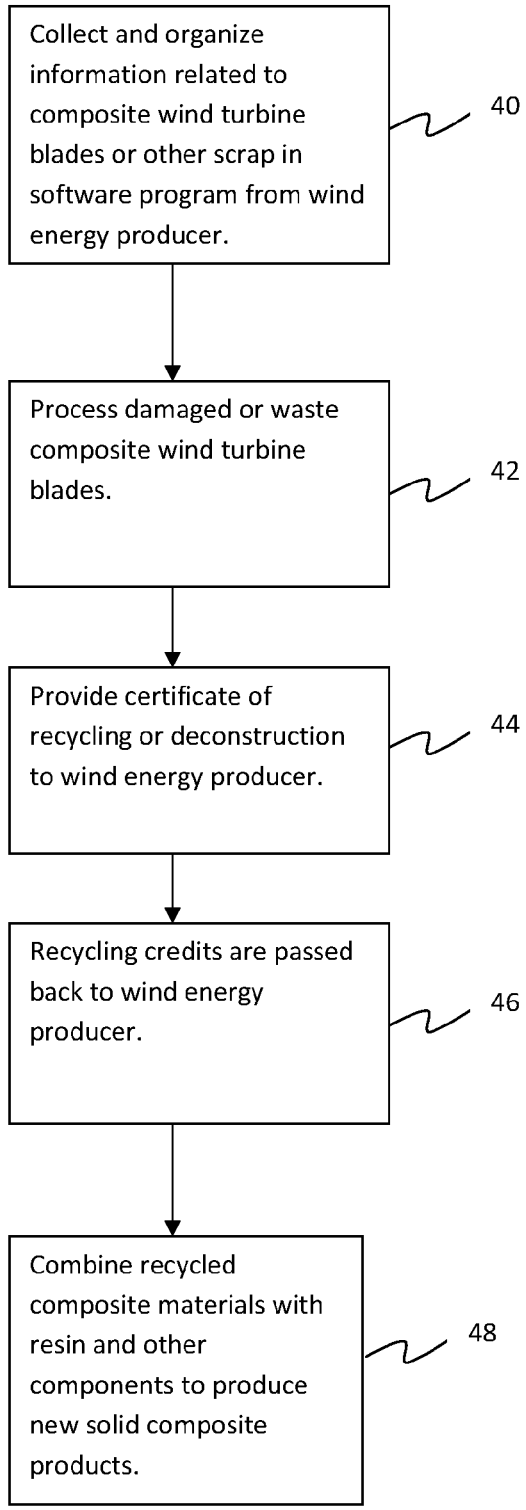
FIG. 3 is a chart illustrating a method of processing composite materials in parallel with processing of recycling or carbon credits.

Referring to FIG. 3, a system for processing composite materials for recycling and tracking and applying recycling credits includes for example in 40 collecting and organizing information relating to composite products, such as wind turbine blades, or other scrap parts, in a software program tailored to the needs of a wind energy producer. The damaged or scrap parts are processed according to the methods of the disclosure in 42. The processor or recycler provides a certificate of recycling, or a certificate of deconstruction, to the wind energy producer in 44. The processor or recycler, or their agents, may further collect and pass back to the energy producer the recycling credits in 46. The processor or recycler combines the recycled composite materials with resin and optionally other components to produce new solid composite products.

All references cited herein, including patents, patent applications, and publications, are hereby incorporated by reference in their entireties, whether previously specifically incorporated or not.

Having now fully described the inventive subject matter, it will be appreciated by those skilled in the art that the same can be performed within a wide range of equivalent parameters; concentrations, and conditions without departing from the spirit and scope of the disclosure and without undue experimentation.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

What is claimed is:

1. A method of producing solid composite products comprising:
    shredding composite materials to form smaller pieces of shredded composite materials;
    grinding the smaller pieces of shredded composite materials to form particles of composite material, wherein the particles of composite material are pieces of mixed fiber and resin, and wherein the particles of composite material have an average fiber length of about one-quarter inch in diameter;

using the particles to form a solid composite product, wherein the composite materials are recycled windmill turbine blades, and wherein the solid composite product withstands compressive stress of at least about 10,000 psi with a compressive strain of less than about 7%;

combining the particles with a resin to form a mixture;

disposing of the mixture in a form or a mold; and curing the mixture to form a solid composite product, wherein the resin in the cured solid composite product comprises less than about 30% by weight of the cured product, wherein said mixture further comprises binders, fillers, resins, catalysts, strengthening agents or combinations thereof before curing, wherein said mixture further comprises aggregate of solid particulates, and wherein the aggregate of solid particulates is aggregate rock and comprises about 50% by weight of the cured product.

2. The method of claim 1, wherein said mixture further comprises silica.

3. The method of claim 1, wherein said product emits no volatile organic compounds or hazardous air pollutants.

4. The method of claim 1, wherein the particles of composite materials comprise about 15% by weight of the cured product.

5. The method of claim 2, wherein the silica comprises about 30% by weight of the cured product.

6. A method of producing solid composite products comprising:

shredding composite materials to form smaller pieces of shredded composite materials;

grinding the smaller pieces of shredded composite materials to form particles of composite material, wherein the particles of composite material are pieces of mixed fiber and resin, and wherein the particles of composite material have an average fiber length of less than about one-half inch in diameter;

using the particles to form a solid composite product, wherein the composite materials are recycled windmill turbine blades, and wherein the solid composite product withstands compressive stress of at least about 10,000 psi with a compressive strain of less than about 7%;

combining the particles with a resin to form a mixture;

disposing of the mixture in a form or a mold; and curing the mixture to form a solid composite product, wherein the resin in the cured solid composite product comprises less than about 30% by weight of the cured product, wherein said mixture further comprises binders, fillers, resins, catalysts, strengthening agents or combinations thereof before curing, wherein said mixture further comprises aggregate of solid particulates, and wherein the aggregate of solid particulates is aggregate rock and comprises about 50% by weight of the cured product.

7. A method of producing solid composite products comprising:

shredding composite materials to form smaller pieces of shredded composite materials;

grinding the smaller pieces of shredded composite materials to form particles of composite material, wherein the particles of composite material are pieces of mixed fiber and resin, and wherein said particles of composite material have an average fiber length of from about one-eighth inch to about one-half inch in diameter;

using the particles to form a solid composite product, wherein the composite materials are recycled windmill turbine blades, and wherein the solid composite product withstands compressive stress of at least about 10,000 psi with a compressive strain of less than about 7%;

combining the particles with a resin to form a mixture;

disposing of the mixture in a form or a mold; and curing the mixture to form a solid composite product, wherein the resin in the cured solid composite product comprises less than about 30% by weight of the cured product, wherein said mixture further comprises binders, fillers, resins, catalysts, strengthening agents or combinations thereof before curing, wherein said mixture further comprises aggregate of solid particulates, and wherein the aggregate of solid particulates is aggregate rock and comprises about 50% by weight of the cured product.

8. The method of claim 1, wherein the weight of the solid composite product increases less than about 1% after immersion in water for 24 hours.

9. The method of claim 6, wherein said mixture further comprises silica.

10. The method of claim 6, wherein said product emits no volatile organic compounds or hazardous air pollutants.

11. The method of claim 6, wherein the particles of composite materials comprise about 15% by weight of the cured product.

12. The method of claim 9, wherein the silica comprises about 30% by weight of the cured product.

13. The method of claim 6, wherein the weight of the solid composite product increases less than about 1% after immersion in water for 24 hours.

14. The method of claim 7, wherein said mixture further comprises silica.

15. The method of claim 7, wherein said product emits no volatile organic compounds or hazardous air pollutants.

16. The method of claim 7, wherein the particles of composite materials comprise about 15% by weight of the cured product.

17. The method of claim 14, wherein the silica comprises about 30% by weight of the cured product.

18. The method of claim 7, wherein the weight of the solid composite product increases less than about 1% after immersion in water for 24 hours.

* * * * *